United States Patent
Hattori et al.

(10) Patent No.: US 8,958,146 B2
(45) Date of Patent: Feb. 17, 2015

(54) 3D IMAGING MICROSCOPE

(75) Inventors: Toshiyuki Hattori, Tokyo (JP); Hiromi Utsunomiya, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/425,833

(22) Filed: Mar. 21, 2012

(65) Prior Publication Data
US 2012/0243080 A1 Sep. 27, 2012

(30) Foreign Application Priority Data
Mar. 23, 2011 (JP) ................................ 2011-064993

(51) Int. Cl.
G02B 21/00 (2006.01)
G02B 21/36 (2006.01)

(52) U.S. Cl.
CPC ............ *G02B 21/006* (2013.01); *G02B 21/008* (2013.01); *G02B 21/0076* (2013.01); *G02B 21/367* (2013.01)
USPC .......................................... 359/368; 359/393

(58) Field of Classification Search
USPC ........................... 359/368, 391–393, 397, 398
See application file for complete search history.

(56) References Cited

U.S. PATENT DOCUMENTS

| | | | |
|---|---|---|---|
| 4,810,869 A | 3/1989 | Yabe et al. | |
| 6,711,283 B1 | 3/2004 | Soenksen | |
| 7,238,934 B2 | 7/2007 | Motomura | |
| 8,462,355 B2 * | 6/2013 | Vucinic et al. | 356/602 |
| 8,570,649 B2 * | 10/2013 | Truong et al. | 359/385 |
| 8,570,650 B2 * | 10/2013 | Dougherty et al. | 359/385 |
| 8,582,203 B2 * | 11/2013 | Dunsby | 359/368 |
| 2002/0044346 A1 * | 4/2002 | Nguyen et al. | 359/368 |
| 2002/0054429 A1 * | 5/2002 | Engelhardt et al. | 359/368 |
| 2004/0227918 A1 | 11/2004 | Kurosawa | |
| 2005/0013478 A1 * | 1/2005 | Oba et al. | 382/154 |

(Continued)

FOREIGN PATENT DOCUMENTS

| JP | 63167313 A | 7/1988 |
|---|---|---|
| JP | 07063994 A | 3/1995 |

(Continued)

OTHER PUBLICATIONS

Extended European Search Report (EESR) dated Jun. 26, 2012 (in English) in counterpart European Application No. 12002018.5.

(Continued)

*Primary Examiner* — Frank Font
(74) *Attorney, Agent, or Firm* — Holtz, Holtz, Goodman & Chick PC

(57) ABSTRACT

A laser microscope that efficiently performs 3D imaging irrespective of the shape of a specimen, includes an area segmenting section that segments an observation range of a specimen in the direction perpendicular to the optical axis of an objective lens into many areas; a surface-position storing section that stores motorized stage positions in association with the specimen surface positions, for the many areas; a surface-shape estimating section that estimates the specimen surface shape from the motorized stage positions and the specimen surface positions for the many areas; a z-scanning condition determining section that determines the specimen surface positions at desired positions of the motorized stage from the specimen surface shape; and a light detecting section that detects light from the specimen over certain ranges specified with reference to the specimen surface positions, in the optical axis direction of the objective lens.

5 Claims, 10 Drawing Sheets

(56) References Cited

U.S. PATENT DOCUMENTS

| | | | |
|---|---|---|---|
| 2005/0073743 A1* | 4/2005 | Weyh et al. | 359/392 |
| 2005/0161592 A1 | 7/2005 | Watanabe et al. | |
| 2006/0007533 A1* | 1/2006 | Eichhorn et al. | 359/368 |
| 2007/0258122 A1* | 11/2007 | Champoulov et al. | 359/225 |
| 2008/0204864 A1* | 8/2008 | Sander | 359/368 |
| 2009/0213214 A1 | 8/2009 | Yamada | |

FOREIGN PATENT DOCUMENTS

| | | |
|---|---|---|
| JP | 2003-307681 A | 10/2003 |
| JP | 2004342900 A | 12/2004 |
| JP | 2005-202087 A | 7/2005 |
| JP | 2007525689 A | 9/2007 |
| JP | 2007286284 A | 11/2007 |
| JP | 2010078940 A | 4/2010 |
| JP | 2010112969 A | 5/2010 |
| JP | 2011252952 A | 12/2011 |
| WO | 2005119325 A2 | 12/2005 |

OTHER PUBLICATIONS

Japanese Office Action dated Sep. 30, 2014, issued in counterpart Japanese Application No. 2011-064993.

* cited by examiner

↕ OBSERVABLE RANGES

IDEAL RANGES TO BE OBSERVED

CONVENTIONAL OBSERVATION RANGE

3D IMAGING MICROSCOPE

BACKGROUND OF THE INVENTION

1. Field of the Invention

This application is based on Japanese Patent Application No. 2011-064993, the contents of which are incorporated herein by reference.

2. Description of Related Art

The present invention relates to a microscope.

Laser microscopes capable of performing 3D imaging (XYZ scanning) of a thick specimen without slicing the specimen are known in the related art (for example, see Japanese Unexamined Patent Application, Publication No. 2005-202087).

As shown in FIG. 12, a specimen can be observed with a laser microscope from the surface thereof to only a limited depth. Therefore, to acquire a Z-stack (Z-direction cross-sectional images), ideally it is just necessary to acquire a Z-stack for a certain distance from the surface, as shown in FIG. 13. However, since the specimen actually has an uneven surface shape, the start position for the Z-stack needs to be changed in each XY area, and this changing takes significant time to carry out. Therefore, in a conventional laser microscope, images have to be acquired in the entire XYZ range, as shown in FIG. 14, which increases the imaging time.

In a laser microscope disclosed in Japanese Unexamined Patent Application, Publication No. 2005-202087, the Z-scanning start position in each XY area is determined so as to reduce the movement distance in the Z direction, thereby achieving a reduction in imaging time.

BRIEF SUMMARY OF THE INVENTION

An object of the present invention is to provide a microscope capable of efficiently performing 3D imaging irrespective of the shape of a specimen.

Solution to Problem

According to one aspect, the present invention provides a microscope including: a stage on which a specimen is placed; an objective lens that focuses illumination light onto the specimen and collects light from the specimen; a first driving section that moves the stage relative to the objective lens in directions perpendicular to an optical axis of the objective lens; a second driving section that moves the stage relative to the objective lens in an optical axis direction of the objective lens; an area segmenting section that segments an observation range of the specimen in the directions perpendicular to the optical axis of the objective lens into a plurality of areas; a surface-position storing section that stores positions of the stage in association with surface positions of the specimen, for the plurality of areas; a surface-shape estimating section that estimates a surface shape of the specimen from the positions of the stage and the surface positions of the specimen stored in the surface-position storing section for the plurality of areas; a light detecting section that detects light from the specimen over certain ranges specified with reference to the surface positions of the specimen estimated by the surface-shape estimating section in the optical axis direction of the objective lens; and an image generating section that generates a 3D image of the specimen from the light from the specimen detected by the light detecting section and a light-collecting position of the objective lens, in each of the plurality of areas.

According to the above-described aspect, the objective lens focuses illumination light onto the specimen placed on the stage and collects light from the specimen. At this time, the stage is moved relative to the objective lens in the directions perpendicular to the optical axis of the objective lens by the first driving section and in the optical axis direction of the objective lens by the second driving section. Thus, the light-collecting position of illumination light on the specimen is three-dimensionally moved, the light detecting section detects light produced from the specimen at this time, and the image generating section associates the detected light with the light-collecting position of the objective lens, thereby generating a 3D image of the specimen.

In this case, the area segmenting section segments the observation range of the specimen into a plurality of areas in the directions perpendicular to the optical axis of the objective lens, and the surface-position storing section stores the positions of the stage in association with the surface positions of the specimen, for some areas among the plurality of areas. The surface-shape estimating section estimates the surface shape of the specimen from the stored information. The light detecting section detects light from the specimen over certain ranges specified with reference to the estimated surface positions of the specimen in the optical axis direction of the objective lens, for all of the areas, and the image generating section generates a 3D image of the specimen.

By doing so, it is possible to focus illumination light onto the vicinity of the surface of the specimen in all of the areas of the specimen to acquire cross-sectional images (Z stack) of the specimen in the optical axis direction of the objective lens and to efficiently generate a 3D image of the specimen.

The above-described microscope may further include: an imaging condition storing section that stores, for the plurality of areas, the positions of the stage in association with imaging conditions for the specimen in the optical axis direction of the objective lens; and an imaging condition determining section that uses the imaging conditions stored in the imaging condition storing section to determine imaging conditions in the optical axis direction of the objective lens at the surface positions of the specimen estimated by the surface-shape estimating section.

By doing so, it is possible to determine imaging conditions in the optical axis direction of the objective lens at the surface positions of the specimen estimated by the surface-shape estimating section, by using the imaging conditions (for example, the Z coordinate at which Z-scanning is started, the Z coordinate at which Z-scanning is ended, and the interval over which Z-scanning is performed) stored in the imaging condition storing section. Thus, it is possible to eliminate the need to determine the imaging conditions in each area and to efficiently generate a 3D image of the specimen.

In the above-described microscope, the surface-shape estimating section may estimate the surface shape of the specimen by determining an equation of a plane passing through three points from the positions of the stage and the coordinates of the surface positions of the specimen for the three points.

By doing so, when the positions of the stage and the coordinates of the surface positions of the specimen are stored in the surface-position storing section for three points, and the equation of a plane is determined from the coordinates, it is possible to easily estimate the surface shape of the specimen. Thus, it is possible to acquire cross-sectional images (Z stack) of the specimen for all of the areas of the specimen and to efficiently generate a 3D image of the specimen.

The above-described microscope may further include a surface-position detecting section that detects the surface positions of the specimen to be stored in the surface-position storing section.

By doing so, the surface-position detecting section can automatically detect the surface positions of the specimen, and the detected surface positions of the specimen can be stored in the surface-position storing section in association with the positions of the stage. Thus, it is possible to eliminate the time required to manually search for surface positions of the specimen in a plurality of areas and to improve the efficiency of generation of a 3D image of the specimen.

In the above-described microscope, the surface-position detecting section may detect the surface positions of the specimen based on luminance information about the light from the specimen, detected by the light detecting section.

By doing so, it is possible to easily detect the surface positions of the specimen with high accuracy and to improve the efficiency of generation of a 3D image of the specimen A.

Advantageous Effects of Invention

According to the present invention, an advantage is afforded in that 3D imaging is efficiently performed irrespective of the shape of a specimen.

DETAILED DESCRIPTION OF THE INVENTION

First Embodiment

A laser microscope according to a first embodiment of the present invention will be described with reference to the drawings.

Figure 1:
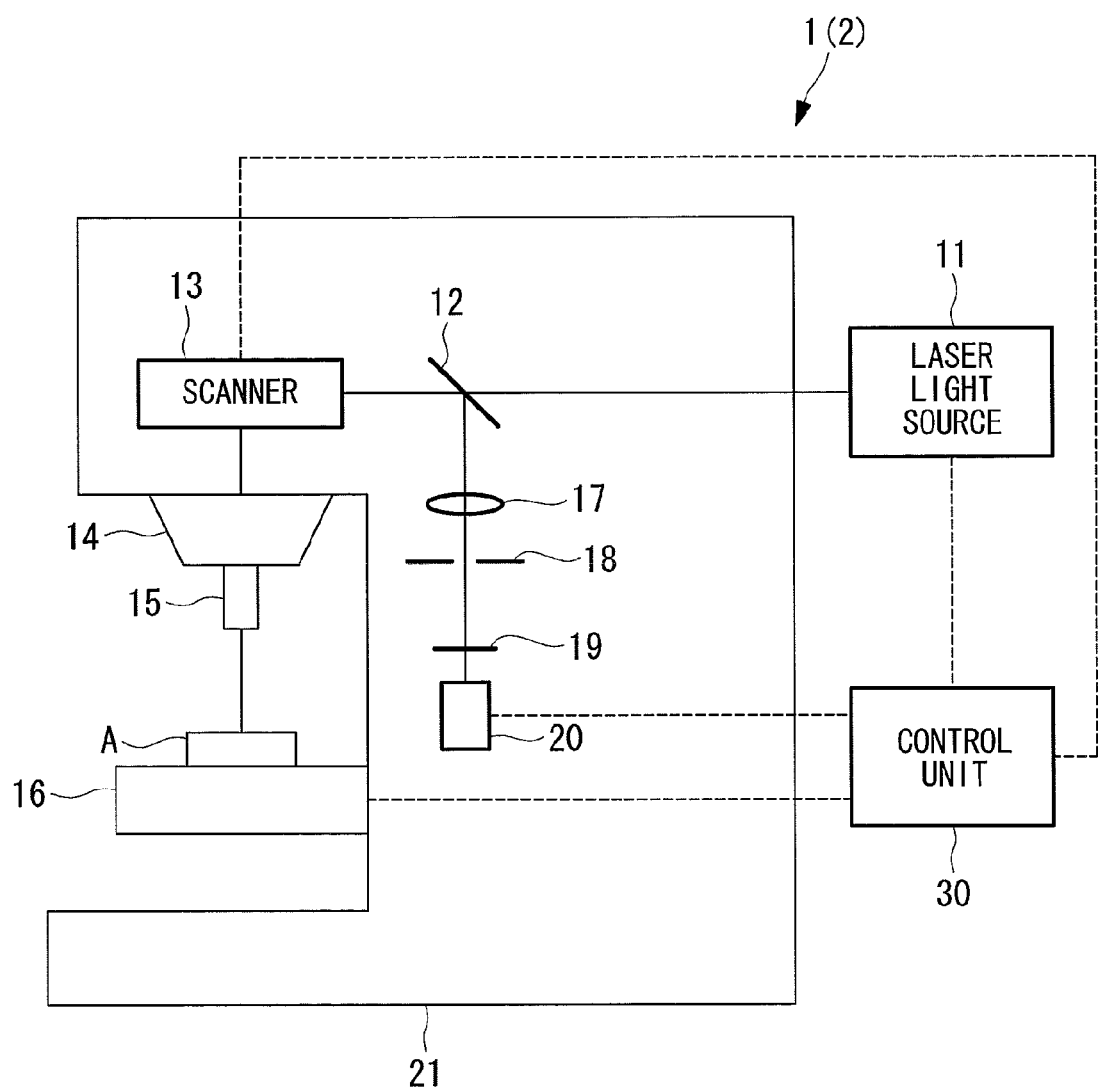
FIG. 1 is an outline structural view of a laser microscope according to embodiments of the present invention.

FIG. 1 is an outline structural view of a laser microscope 1 according to this embodiment. As shown in FIG. 1, the laser microscope 1 of this embodiment includes a laser light source 11, a dichroic mirror 12, a scanner 13, a revolver 14, an objective lens 15, a motorized stage 16, a lens 17, a pinhole plate 18, a barrier filter 19, a light detector 20, a microscope main body 21, and a control unit 30.

The laser light source 11 emits laser light in the form of a spot of light (converging rays) for scanning the surface of a specimen A. The laser light excites a fluorescent indicator in the specimen A to make it produce fluorescence. The laser light source 11 is controlled by the control unit 30.

The scanner 13 has a pair of aluminum-coated galvanometer mirrors (not shown), for example, and is driven by a raster scanning method by changing the angles of oscillation of the pair of galvanometer mirrors. With this configuration, the scanner 13 performs 2D scanning of the laser light from the laser light source 11 on the specimen A. The scanner 13 is controlled by the control unit 30.

The revolver 14 has a plurality of objective lenses 15 with different magnifications and is capable of disposing, from among the plurality of objective lenses 15, an objective lens 15 with a desired magnification in the observation light path of the laser microscope 1.

The objective lens 15 radiates the laser light used for scanning performed by the scanner 13 onto the specimen A placed on the motorized stage 16 and collects fluorescence produced from the specimen A.

The dichroic mirror 12 is disposed in the path of the laser light between the laser light source 11 and the scanner 13 and is a wavelength selecting mirror that selects the fluorescence from the specimen A obtained via the scanner 13 and that guides the fluorescence to the light detector 20. Specifically, the dichroic mirror 12 transmits the laser light emitted from the laser light source 11 and reflects, to the light detector 20, the fluorescence that has been produced from the specimen A, collected by the objective lens 15, and passed through the scanner 13. With this configuration, the dichroic mirror 12 separates the path of the laser light and the path of the fluorescence from the specimen A.

The motorized stage 16 is disposed facing the objective lens 15, and the specimen A is placed on the motorized stage 16.

The microscope main body 21 is provided with a first driving section (not shown) that moves the motorized stage 16 in the directions (XY directions) perpendicular to the optical axis of the objective lens 15 and a second driving section (not shown) that moves the motorized stage 16 in the optical axis direction (Z direction) of the objective lens 15. The first driving section and the second driving section are operated to relatively move the motorized stage 16 and the specimen A on the motorized stage 16 in 3D directions (XYZ directions) with respect to the objective lens 15. The first driving section and the second driving section are controlled by the control unit 30.

The pinhole plate 18 has a pinhole through which only fluorescence produced from the focal position of the laser light in the specimen A passes. In other words, when the fluorescence collected by the objective lens 15 and reflected by the dichroic mirror 12 passes through the pinhole plate 18, light from positions shifted in the optical axis direction from the focal position of the laser light is cut. Thus, only the fluorescence from the same plane in the optical axis direction as the focal position enters the barrier filter 19. Furthermore, the lens 17, for converging the fluorescence from the specimen A onto the pinhole, is disposed between the dichroic mirror 12 and the pinhole plate 18.

The barrier filter 19 has a filter property of transmitting the fluorescence from the specimen A and blocking the laser light and removes a laser light component from the fluorescence that has passed through the pinhole plate 18.

The light detector 20 is a photoelectric conversion element that detects the fluorescence that has been transmitted through the barrier filter 19 and converts the detected fluorescence into an electrical signal corresponding to the light intensity of the fluorescence.

As described later, the control unit 30 associates the electrical signal sent from the light detector 20 with the scanning position on the specimen A scanned by the scanner 13 and the XYZ position of the motorized stage 16, thus generating a fluorescence image of the specimen A.

Figure 2:
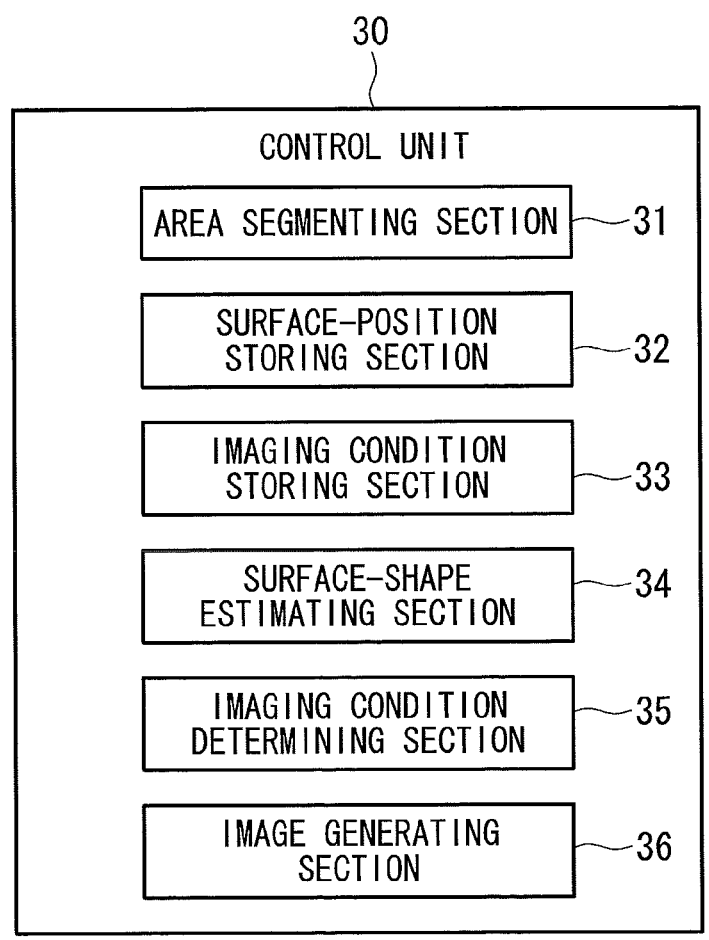
FIG. 2 is a functional block diagram of a control unit according to a first embodiment of the present invention.

Processing to be performed by the control unit 30 will be described below with reference to FIG. 2. FIG. 2 is a functional block diagram showing functions of the control unit 30.

As shown in FIG. 2, the control unit 30 includes, as functions, an area segmenting section 31, a surface-position storing section 32, a Z-scanning condition storing section (imaging condition storing section) 33, a surface-shape estimating section 34, a Z-scanning condition determining section (imaging condition determining section) 35, and an image generating section 36.

Figure 3A:
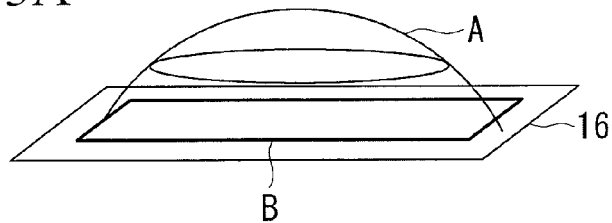
FIG. 3A is a view for explaining a state in which Z-scanning is performed for respective XY areas by the control unit shown in FIG. 2.
Figure 3B:
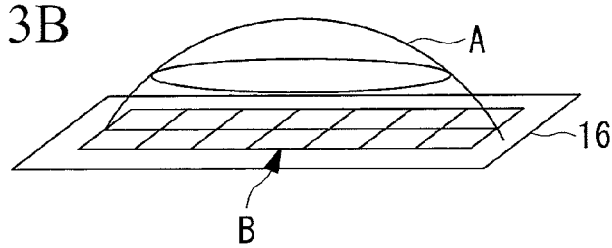
FIG. 3B is a view for explaining a state in which Z-scanning is performed for the respective XY areas by the control unit shown in FIG. 2.

The area segmenting section 31 segments an observation range of the specimen A in the directions (XY directions) perpendicular to the optical axis of the objective lens 15 into a plurality of areas. Specifically, as shown in FIG. 3A, the area segmenting section 31 defines an observation range B of the specimen A in the XY directions from the range of movement of the motorized stage 16 in the XY directions. Then, as shown in FIG. 3B, the area segmenting section 31 calculates the size of a field of view (area) to be determined from observation conditions (for example, the magnification of the objective lens 15 and the scanning range of the scanner 13) and segments the observation range B into a plurality of areas. In the example shown in FIG. 3D, the observation range B is segmented into 14 areas.

Figure 3C:
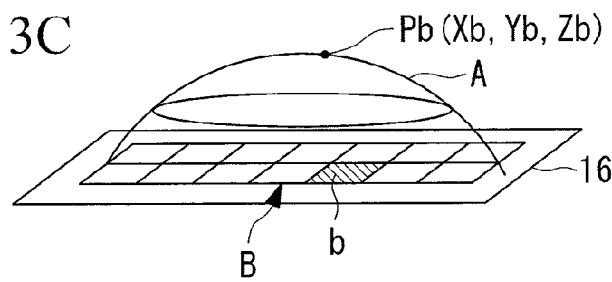
FIG. 3C is a view for explaining a state in which Z-scanning is performed for the respective XY areas by the control unit shown in FIG. 2.

The surface-position storing section 32 stores, for each of a plurality of areas, the position of the motorized stage 16 in the XY directions with respect to the objective lens 15 in association with the surface position of the specimen A in the Z direction with respect to the objective lens 15. Specifically, as shown in FIG. 3C, the surface-position storing section 32 stores, for a surface portion of the specimen A corresponding to an area b, for example, the coordinates (Xb, Yb) of a center position Pb thereof in the XY directions in association with the coordinate (Zb) of the center position Pb thereof in the Z direction. Note that how to calculate the surface position (Zb) of the specimen A in the Z direction will be described later.

Figure 3D:
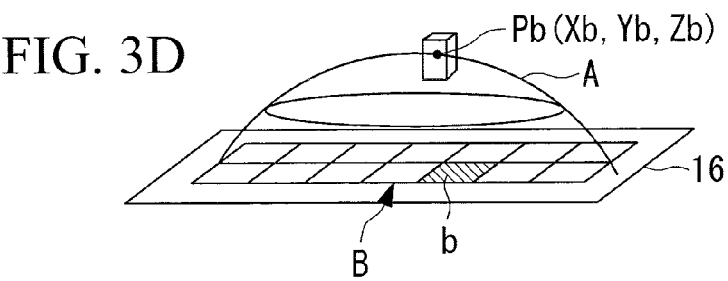
FIG. 3D is a view for explaining a state in which Z-scanning is performed for the respective XY areas by the control unit shown in FIG. 2.

The Z-scanning condition storing section 33 stores, for each of the plurality of areas, the position of the motorized stage 16 in the XY directions with respect to the objective lens 15 in association with Z-scanning conditions corresponding to the position of the motorized stage 16. Specifically, as shown in FIG. 3D, the Z-scanning condition storing section 33 stores the position of the motorized stage 16 corresponding to, for example, the area b in association with the Z-scanning conditions (specifically, a Z coordinate at which Z-scanning is started, a Z coordinate at which Z-scanning is ended, and the interval over which Z-scanning is performed) corresponding to this position.

Figure 3E:
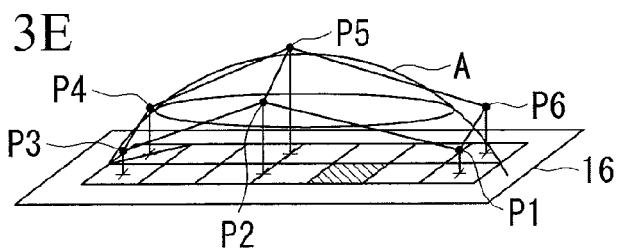
FIG. 3E is a view for explaining a state in which Z-scanning is performed for the respective XY areas by the control unit shown in FIG. 2.

The surface-shape estimating section 34 estimates the surface shape of the specimen A from the positions of the motorized stage 16 (in the XY directions) and the surface positions of the specimen A (in the Z direction) for the plurality of areas, stored in the surface-position storing section 32. Specifically, as shown in FIG. 3E, the surface-shape estimating section 34 estimates the surface shape of the specimen A from, for example, the XYZ coordinates of surface positions P1 to P6 of the specimen A stored in the surface-position storing section 32.

More specifically, for example, the surface-shape estimating section 34 substitutes the coordinates (X, Y, Z) of three adjacent points among the surface positions P1 to P6 of the specimen A into the following equation of a plane and calculates coefficients a, b, c, and d in the equation of the plane.

$$aX+bY+cZ+d=0$$

Thus, the equation of the plane passing through the coordinates of the three adjacent points is calculated. The equations of a plurality of planes are calculated for all combinations of three adjacent points, and the planes thus calculated are combined, thereby estimating the surface shape of the specimen A. By doing so, the surface shape of the specimen A can be easily estimated.

Figure 3F:
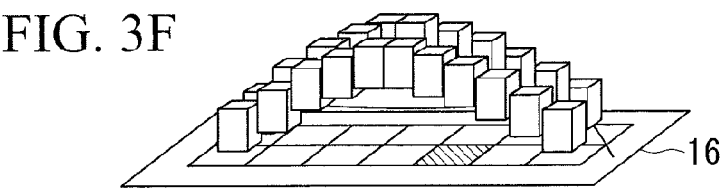
FIG. 3F is a view for explaining a state in which Z-scanning is performed for the respective XY areas by the control unit shown in FIG. 2.

The Z-scanning condition determining section 35 determines the Z-scanning conditions at desired positions of the motorized stage 16. Specifically, as shown in FIG. 3F, for all of the areas (in the XY directions), the Z-scanning condition determining section 35 determines certain ranges specified with reference to the surface positions of the specimen A, as ranges in which light from the specimen A is to be detected by the light detector 20, from the surface shape of the specimen A estimated by the surface-shape estimating section 34 and the Z-scanning conditions stored in the Z-scanning condition storing section 33.

The image generating section 36 generates a 3D image of the specimen A from light from the specimen A detected by the light detector 20 and the light-collecting position (i.e., the XYZ coordinates) of the objective lens 15 in the XY directions and the Z direction, in each of the areas of the specimen A.

The operation of the laser microscope 1, having the above-described configuration, will be described below.

To observe the specimen A by using the laser microscope 1 of this embodiment, laser light emitted from the laser light source 11 is transmitted through the dichroic mirror 12 and enters the scanner 13. The scanner 13 performs 2D scanning of the laser light on the specimen A, and the objective lens 15 focuses the laser light onto the specimen A.

At the focal position of the laser light in the specimen A, a fluorescent substance in the specimen A is excited to produce fluorescence. The produced fluorescence is collected by the objective lens 15, is transmitted through the scanner 13, and is reflected by the dichroic mirror 12. The reflected fluorescence is converged by the lens 17 onto the pinhole of the pinhole plate 18 and passes through the pinhole plate 18, thereby cutting fluorescence coming from positions shifted in the optical axis direction from the focal position of the laser light. Thus, only the fluorescence from the same plane in the optical axis direction as the focal position enters the barrier filter 19, so that the barrier filter 19 removes a laser light component from the fluorescence that has passed through the pinhole plate 18.

The fluorescence transmitted through the barrier filter 19 is detected by the light detector 20 and is converted into an electrical signal corresponding to the light intensity of the fluorescence. The electrical signal is output to the image generating section 36 of the control unit 30 and is associated with the scanning position of the specimen A scanned by the scanner 13, thereby generating a fluorescence image of the specimen A. The above-described processing is performed for each field of view (area) by operating the motorized stage 16, thereby generating a fluorescence image of the specimen A in the observation range.

Figure 4:
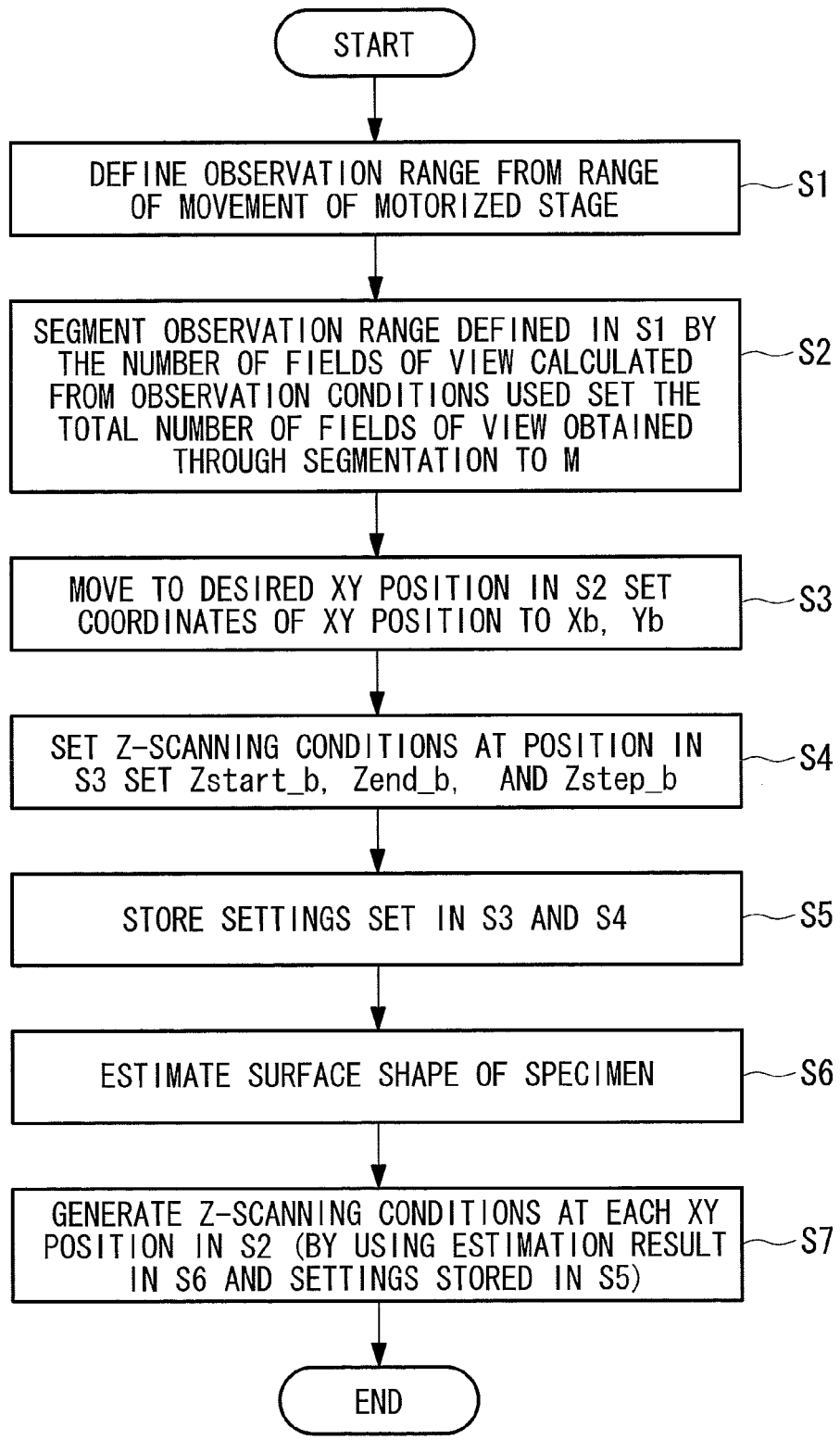
FIG. 4 is a flowchart showing processing performed by the control unit shown in FIG. 2.

In this case, processing for performing 3D imaging of the specimen A will be described below with reference to a flowchart shown in FIG. 4.

First, the observation range of the specimen A is defined in the directions (XY directions) perpendicular to the optical axis of the objective lens 15 (Step S1). Specifically, as shown in FIG. 3A, the observation range B of the specimen A in the XY directions is defined from the range of movement of the motorized stage 16 in the XY directions.

Next, the area segmenting section 31 segments the observation range B defined in Step S1 by the number of fields of view to be determined from the observation conditions (Step S2). Specifically, as shown in FIG. 3B, for example, the number of fields of view (areas) to be determined from the observation conditions, such as the magnification of the objective lens 15 and the scanning range of the scanner 13, is calculated, and the observation range B is segmented into a plurality of areas. Here, the number of fields of view (areas) obtained through segmentation is set to M.

Next, the field of view of the objective lens 15 is moved to a desired XY position obtained in Step S2 (Step S3). Specifically, the motorized stage 16 is operated to move the specimen A in the XY directions with respect to the objective lens 15, and, as shown in FIG. 3C, to move the field of view of the objective lens 15 to a desired area (the area b in the example shown in FIG. 3C) among the areas obtained through the segmentation in Step S2. At this time, the coordinates of the area in the XY directions are set to Xb, Yb.

Next, the Z-scanning conditions are set at the position to which the field of view of the objective lens 15 has been moved in Step S3 (Step S4). Specifically, as shown in FIG. 3D, the motorized stage 16 is operated to move the specimen A in the Z direction with respect to the objective lens 15, and a 3D image of the specimen A acquired at this time is observed. Then, a certain range located in the vicinity of the surface of the specimen A is set as a range in which Z-scanning is to be performed. Here, in a surface portion of the specimen A corresponding to the area b, the Z coordinate at which Z-scanning is started is set to Zstart_b, the Z coordinate at which Z-scanning is ended is set to Zend_b, and the interval over which Z-scanning is performed is set to Zstep_b.

Next, the settings set in Steps S3 and S4 are stored (Step S5). Specifically, for each of the plurality of areas, the position of the motorized stage 16 in the XY directions with respect to the objective lens 15 and the surface position of the specimen A in the Z direction with respect to the objective lens 15 are stored in the surface-position storing section 32 in association with each other. Furthermore, for each of the plurality of areas, the position of the motorized stage 16 in the XY directions with respect to the objective lens 15 and the above-described Z-scanning conditions are stored in the Z-scanning condition storing section 33 in association with each other.

More specifically, as shown in FIG. 3D, for example, for the surface portion of the specimen A corresponding to the area b, the coordinates (Xb, Yb) of the center position Pb thereof in the XY directions, the coordinate (Zb) of the center position Pb thereof in the Z direction, and the Z-scanning conditions (the Z coordinate at which Z-scanning is started, the Z coordinate at which Z-scanning is ended, and the interval over which Z-scanning is performed) are stored in association with each other.

Next, the surface shape of the specimen is estimated (Step S6). Specifically, as shown in FIG. 3E, the surface-shape estimating section 34 estimates the surface shape of the specimen A from the coordinates of the surface positions P1 to P6 of the specimen A, stored in advance in the surface-position storing section 32, for example. Detailed processing to be performed at this time will be described later.

Next, the Z-scanning conditions at each XY position obtained in Step S2 are generated by using the estimation result obtained in Step S6 and the settings stored in Step S5 (Step S7). Specifically, as shown in FIG. 3F, for every area, the Z-scanning condition determining section 35 determines a certain range specified with reference to the surface position of the specimen A estimated by the surface-shape estimating section 34, as a range in which light from the specimen A is to be detected by the light detector 20. Detailed processing to be performed at this time will be described later.

The above-described processing is performed for each of the fields of view (areas) by operating the motorized stage 16, thereby generating a 3D image of the specimen A.

Figure 5:
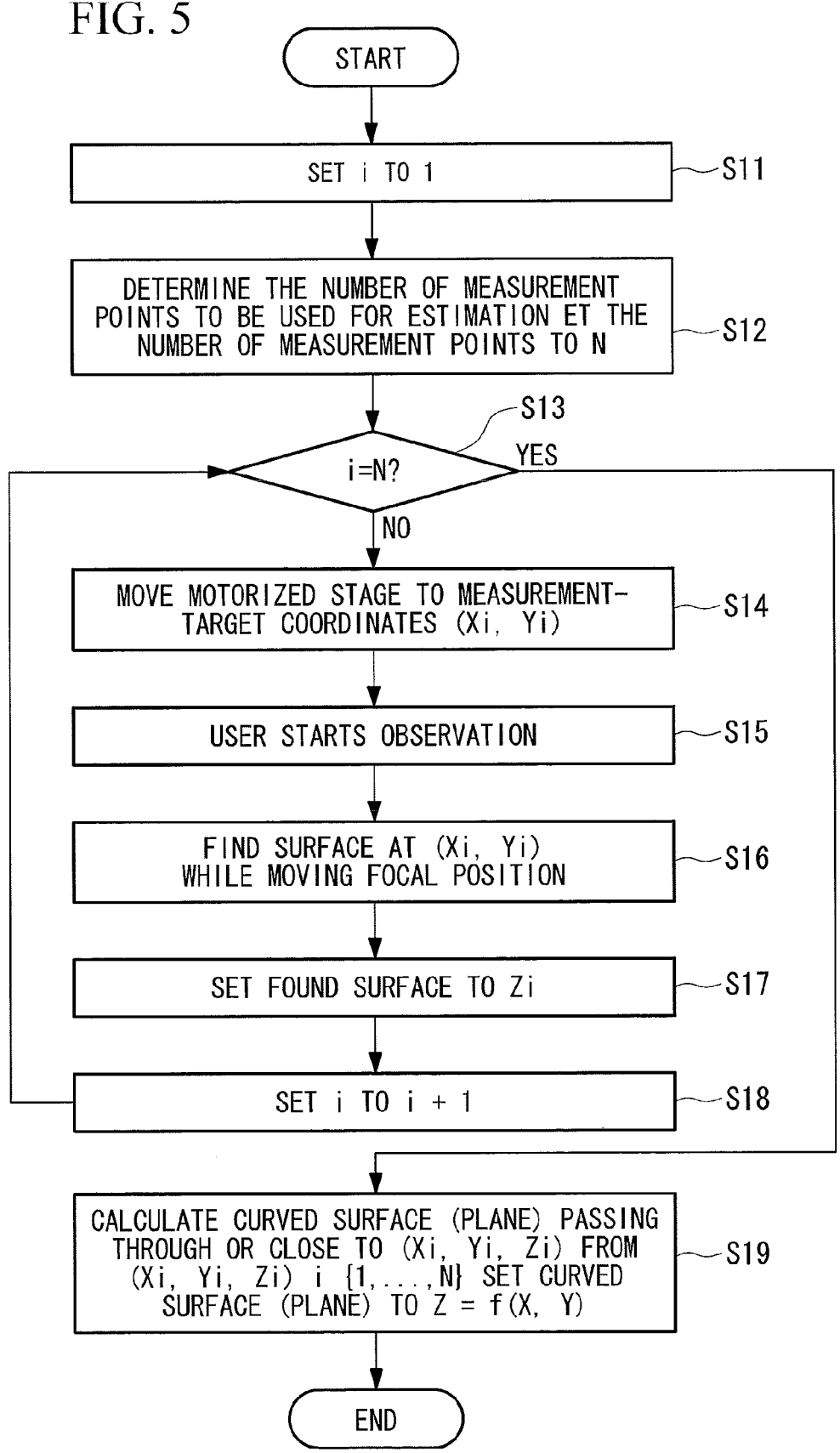
FIG. 5 is a flowchart showing detailed processing of Step S6 shown in FIG. 4.

The detailed processing of Step S6, described above, will be described below with reference to FIG. 5.

First, i is set to 1 (Step S11), and the number of measurement points to be used to estimate the surface shape of the specimen A is determined (Step S12). Here, the number of measurement points is set to N. Note that the accuracy of estimation of the surface shape of the specimen A can be improved as the number of measurement points is increased.

Next, it is determined whether i is equal to N (Step S13). If i is not equal to N, the motorized stage 16 is operated to move to the measurement-target coordinates (Xi, Yi) (Step S14).

The user starts observation in this state (Step S15) and finds the surface of the specimen A at the coordinates (Xi, Yi) while moving the focal position of the objective lens 15 in the Z direction (Step S16). The Z coordinate thus found is set to Zi (Step S17).

Next, i is set to "i+1" (Step S18). The flow returns to Step S13, and, if i is not equal to N, processing from Step S14 to Step S18 is repeated.

If i is equal to N in Step S13, a curved surface or plane passing through (Xi, Yi, Zi) is calculated from (Xi, Yi, Zi) i∈{1, . . . , N} (Step S19). Specifically, as described above, the equation of a plane passing through the coordinates of three adjacent points is calculated.

To calculate a plane passing through these points, the surface-shape estimating section 34 substitutes, for example, the coordinates (X, Y, Z) of the three adjacent points among the plurality of measurement points on the specimen A into the following equation of a plane and calculates the coefficients a, b, c, and d in the following equation of the plane.

$$aX+by+cZ+d=0$$

Thus, the equation of the plane passing through the coordinates of the three adjacent points is calculated. The equations of a plurality of planes are calculated for all combinations of three adjacent points, and the planes thus calculated are combined, thereby estimating the surface shape of the specimen A. By doing so, the surface shape of the specimen A can be easily estimated.

Figure 6:
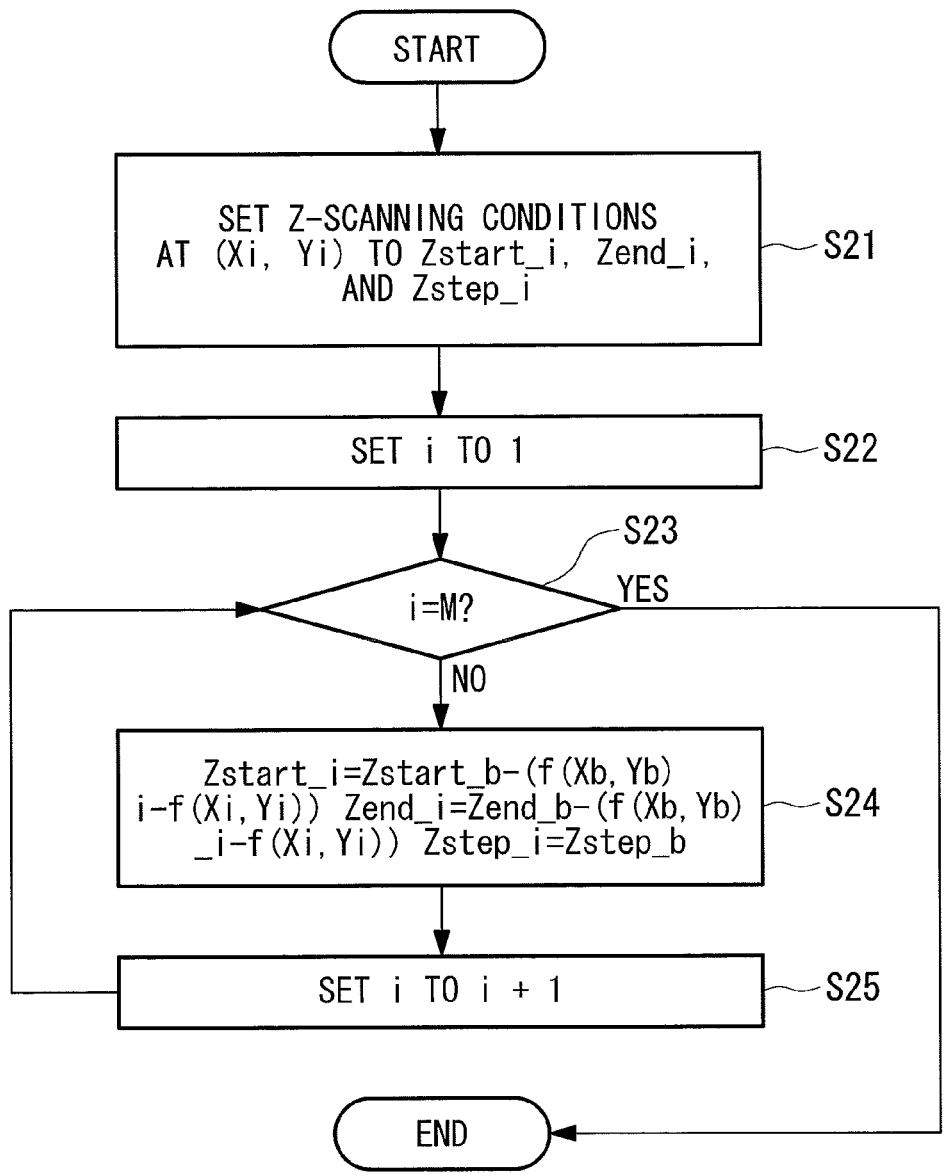
FIG. 6 is a flowchart showing detailed processing of Step S7 shown in FIG. 4.

The detailed processing of Step S7, described above, will be described below with reference to FIG. 6.

First, the Z-scanning conditions at the coordinates (Xi, Yi) are set as follows (Step S21).

Zstart_i
Zend_i
Zstep_i

Next, i is set to 1 (Step S22). It is determined whether i is equal to M (Step S23). Here, as described above, M is the number of fields of view (areas) into which the observation range B is segmented.

If i is not equal to M in Step S23, the Z-scanning conditions are set as follows (Step S24).

$$Zstart\_i = Zstart\_b - (f(Xb, Yb)\_i - f(Xi, Yi))$$

$$Zend\_i = Zend\_b - (f(Xb, Yb)\_i - f(Xi, Yi))$$

$$Zstep\_i = Zstep\_b$$

Next, i is set to "i+1" (Step S25). The flow returns to Step S23, and, if i is not equal to M, processing from Step S24 to Step S25 is repeated.

If i is equal to M in Step S23, the processing ends.

By performing the above-described processing, it is possible to observe only required ranges of the specimen A without setting Z-scanning conditions at all observation ranges, even if the specimen A has a surface having curvature or is inclined.

As described above, according to the laser microscope 1 of this embodiment, the area segmenting section 31 segments the observation range of the specimen A into a plurality of areas in the directions (XY directions) perpendicular to the optical axis of the objective lens 15. Furthermore, the surface-position storing section 32 and the Z-scanning condition storing section 33 store the positions of the motorized stage 16 in association with the surface positions of the specimen A and the Z-scanning conditions, for a plurality of areas among the areas obtained through the segmentation. The surface-shape estimating section 34 estimates the surface shape of the specimen A from these pieces of stored information. The Z-scanning condition determining section 35 determines the Z-scanning conditions for desired positions of the motorized stage 16. Thus, light from the specimen A is detected by the light detector 20 over the certain ranges specified with reference to the surface positions of the specimen A, and the image generating section 36 generates a 3D image of the specimen A.

By doing so, it is possible to acquire, for all of the areas of the specimen A, cross-sectional images (Z stack) of the specimen A in the optical axis direction of the objective lens 15 by focusing illumination light in the vicinity of the surface of the specimen A and to efficiently generate a 3D image of the specimen A.

The Z-scanning conditions (the Z coordinate at which Z-scanning is started, the Z coordinate at which Z-scanning is ended, and the interval over which Z-scanning is performed) stored in the Z-scanning condition storing section 33 can be used to determine Z-scanning conditions in the optical axis direction of the objective lens 15 at the surface positions of the specimen A estimated by the surface-shape estimating section 34. Thus, it is possible to eliminate the need to determine Z-scanning conditions for each area and to efficiently generate a 3D image of the specimen A.

Figure 7:
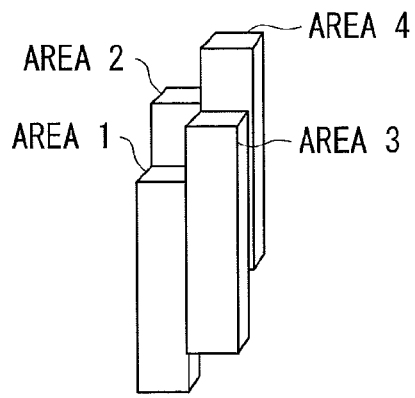
FIG. 7 is a view showing part of 3D images of a specimen.
Figure 8:
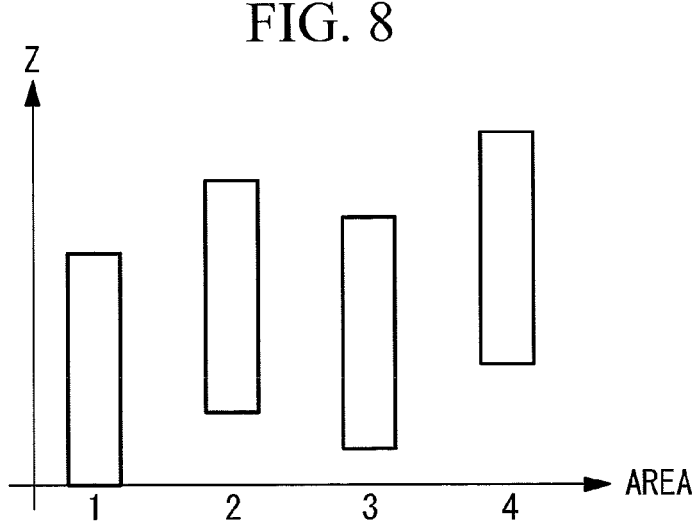
FIG. 8 is a graph showing imaging data of areas in the Z direction shown in FIG. 7.

In the laser microscope 1 according to this embodiment, as shown in FIG. 7, the Z-scanning start positions and end positions of the 3D images of the areas of the specimen A are different. Therefore, as shown in FIG. 8, when these 3D images are arrayed, an image in which the 3D images of the specimen A are not smoothly connected is generated because the portion where imaging data exists differs from area to area.

Figure 9:
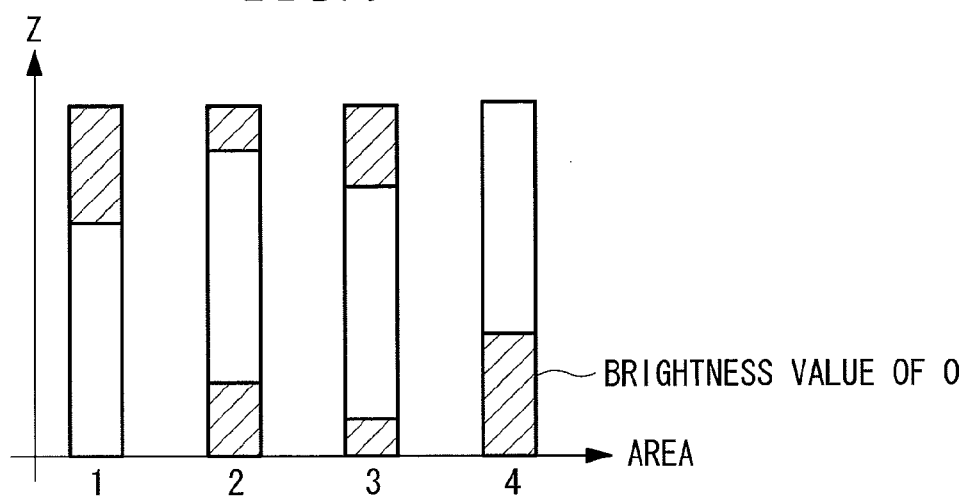
FIG. 9 is a graph of the imaging data shown in FIG. 8 to which data with a brightness value of 0 is added.

Therefore, in the laser microscope 1 of this embodiment, as shown in FIG. 9, images with a brightness value of 0 are added to a portion where data does not exist in each area. Thus, it is possible to make the respective areas have the same image length in the Z direction and to generate a continuous 3D image of the specimen A.

Second Embodiment

Next, a laser microscope according to a second embodiment of the present invention will be described.

A laser microscope 2 of this embodiment differs from the laser microscope 1 of the above-described embodiment in that surface positions of the specimen A are automatically detected. The laser microscope 2 of this embodiment will be described below mainly in terms of the differences from the laser microscope 1 of the first embodiment, and a description of similarities will be omitted.

Figure 10:
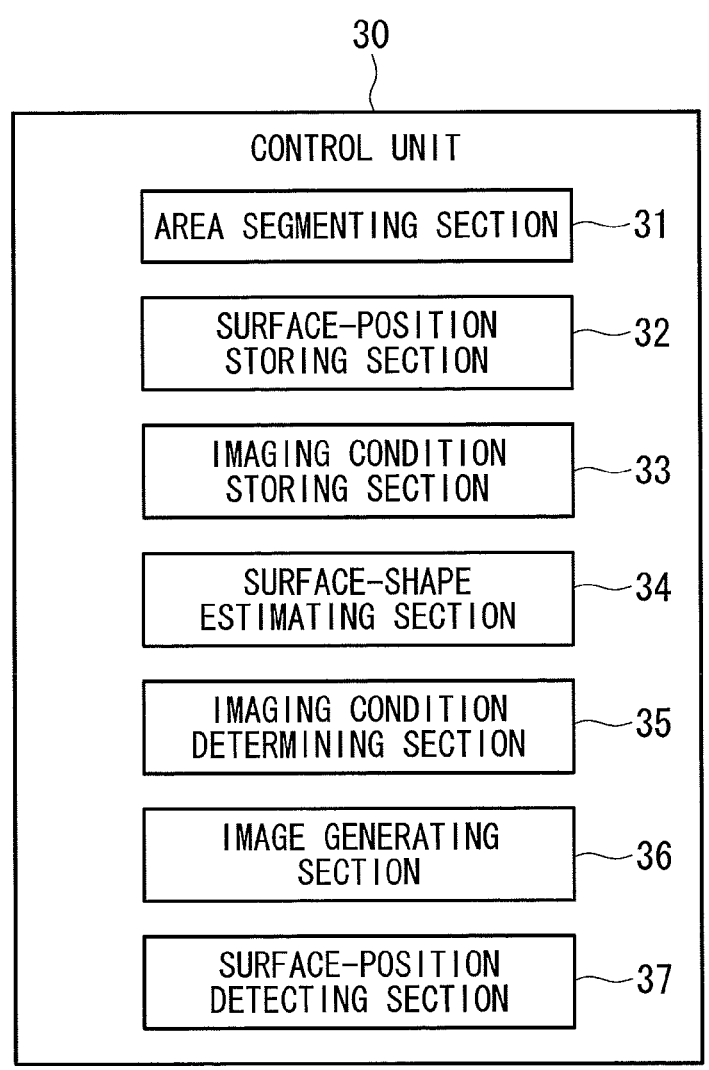
FIG. 10 is a functional block diagram of a control unit according to a second embodiment of the present invention.

In the laser microscope 2 of this embodiment, as shown in FIG. 10, the control unit 30 includes, as a function, a surface-position detecting section 37 that detects surface positions of the specimen A, in addition to the functions described in the above-described embodiment (see FIG. 2).

Figure 11:
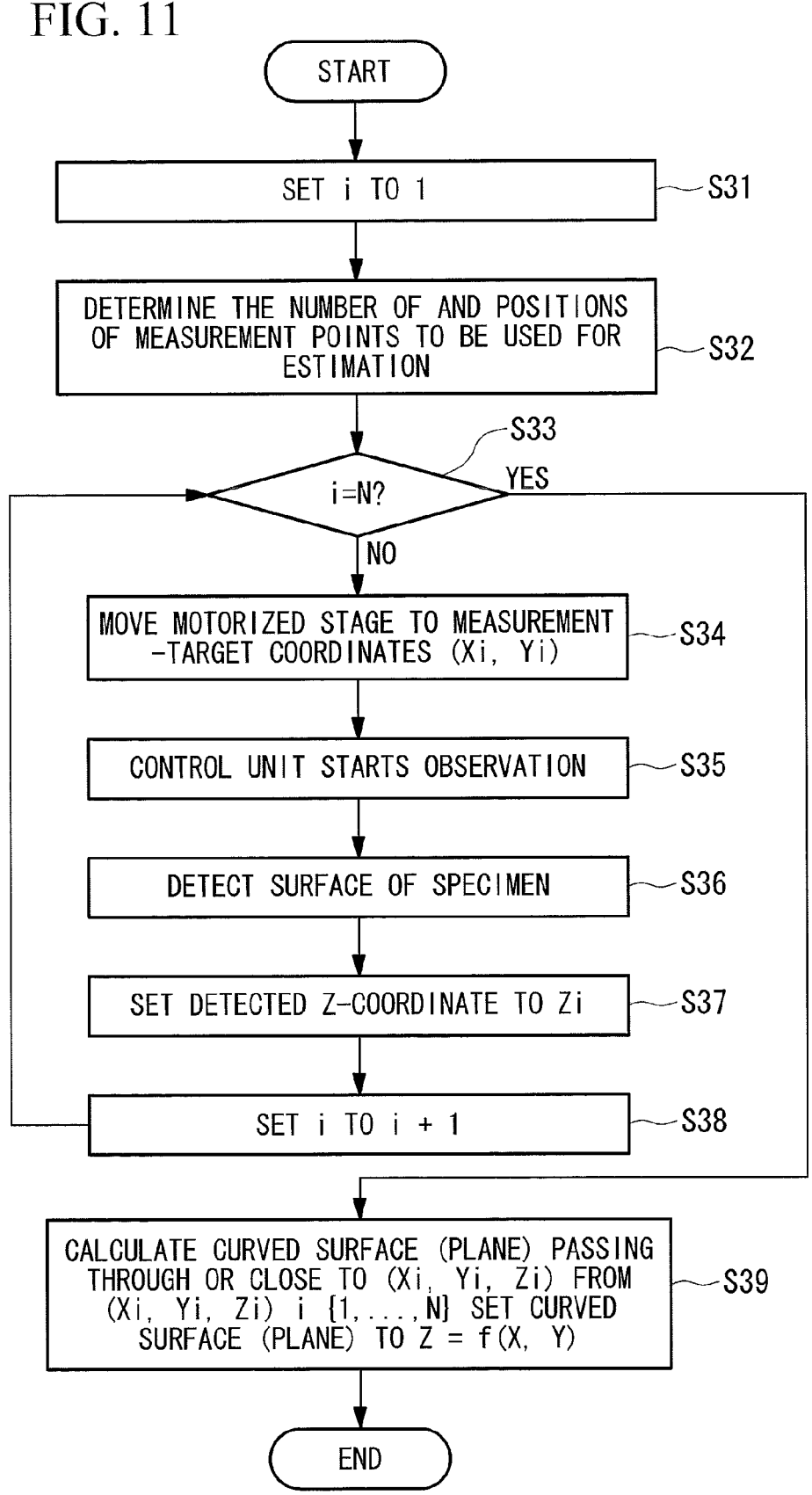
FIG. 11 is a flowchart showing detailed processing of Step S6 shown in FIG. 4 performed by the control unit shown in FIG. 10.
Figure 12:
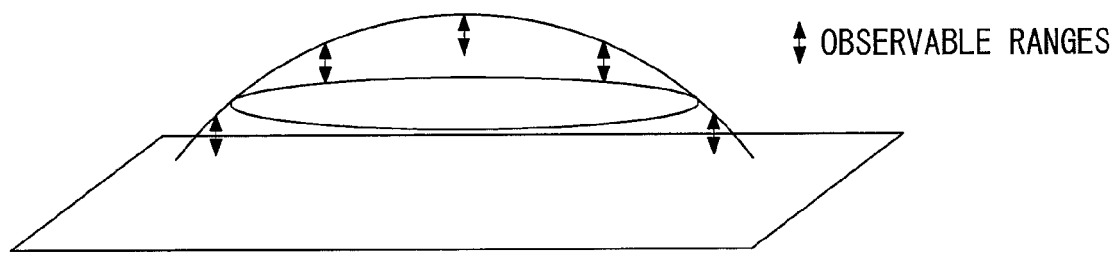
FIG. 12 is a view showing actual ranges that can be observed by a laser microscope.
Figure 13:
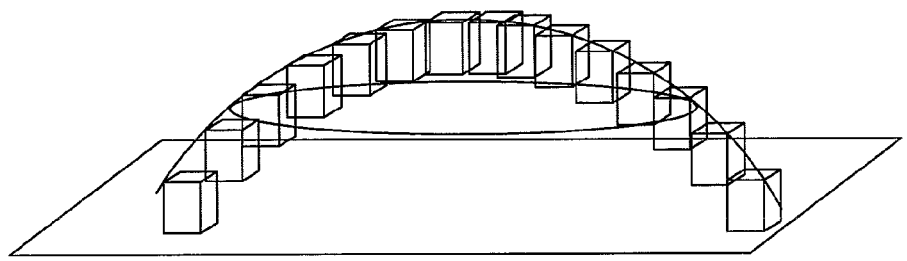
FIG. 13 is a view showing ideal ranges that can be observed by the laser microscope.
Figure 14:
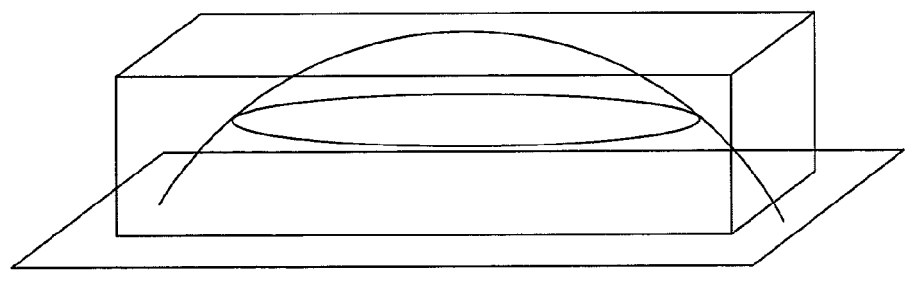
FIG. 14 is a view showing a range that can be observed by a conventional laser microscope.

The operation of the laser microscope 2 according to this embodiment, having the above-described configuration, will be described with reference to FIG. 11. FIG. 11 is a flowchart showing detailed processing of Step S6 (see FIG. 4), described above, performed by the laser microscope 2 of this embodiment.

First, i is set to 1 (Step S31). The number of and the positions of measurement points to be used to estimate the surface shape of the specimen A are determined (Step S32).

Next, it is determined whether i is equal to N (Step S33). If i is not equal to N, the motorized stage 16 is operated to move to the measurement-target coordinates (Xi, Yi) (Step S34).

In this state, the control unit 30 starts observation (Step S35), and the surface-position detecting section 37 detects the surface of the specimen A at the coordinates (Xi, Yi) (Step S36). At this time, the surface-position detecting section 37 detects the surface position of the specimen A based on luminance information about fluorescence from the specimen A detected by the light detector 20. Specifically, the control unit 30 detects a Z position at which the intensity of the fluorescence from the specimen A detected by the light detector 20 is high, as the vicinity of the surface of the specimen A. The Z coordinate thus found is set to Zi (Step S37).

Next, i is set to "i+1" (Step S38). The flow returns to Step S33, and, if i is not equal to N, the processing from Step S34 to Step S38 is repeated.

If i is equal to N in Step S33, a curved surface or plane passing through (Xi, Yi, Zi) is calculated from (Xi, Yi, Zi) i∈{1, ..., N} (Step S39). Specifically, as described above, the equation of a plane passing through the coordinates of three adjacent points is calculated.

According to the laser microscope 2 of this embodiment, the surface-position detecting section 37 can automatically detect the surface positions of the specimen A, and the detected surface positions of the specimen A can be stored in the surface-position storing section 32 in association with the positions of the motorized stage 16. Thus, it is possible to eliminate the time required to manually search for surface positions of the specimen A in a plurality of areas and to improve the efficiency of generation of a 3D image of the specimen A.

The surface-position detecting section 37 detects the surface positions of the specimen A based on luminance information about light from the specimen A detected by the light detector 20, thus making it possible to easily detect the surface positions of the specimen A with high accuracy and to improve the efficiency of generation of a 3D image of the specimen A.

The embodiments of the present invention have been described above in detail with reference to the drawings. However, the specific configurations are not limited to the embodiments, and design changes that do not depart from the scope of the present invention are also encompassed.

For example, in the embodiments, an example in which the present invention is applied to a single-photon excitation microscope has been described; however, the present invention may be applied to a multiphoton excitation microscope.

What is claimed is:

1. A microscope comprising:
   a stage on which a specimen is placeable;
   a scanner that performs two-dimensional scanning of laser light on the specimen;
   an objective lens that focuses the laser light used for the two-dimensional scanning performed by the scanner onto the specimen and that collects light from the specimen;
   a first driving section that moves the stage relative to the objective lens in directions perpendicular to an optical axis direction of the objective lens;
   a second driving section that moves the stage relative to the objective lens in the optical axis direction of the objective lens;
   a control unit configured to operate as:
      an area segmenting section that segments an observation range of the specimen, in the directions perpendicular to the optical axis direction of the objective lens, into a plurality of two-dimensional areas in which the scanner performs scanning;
      a surface-position storing section that stores a plurality of positions of the stage in association with surface positions of the specimen for a plurality of the two-dimensional areas;
      a surface-shape estimating section that estimates a surface shape of the specimen from the plurality of positions of the stage and the associated surface positions of the specimen stored in the surface-position storing section; and
      an image generating section; and
   a light detecting section that, for a plurality of light-collecting positions of the objective lens in the segmented plurality of two-dimensional areas, detects light from the specimen over certain ranges specified with reference to surface positions of the specimen estimated by the surface-shape estimating section in the optical axis direction of the objective lens; and
   wherein the image generating section is configured to generate a 3D image of the specimen from the light from the specimen detected by the light detecting section at the plurality of light-collecting positions of the objective lens in the segmented plurality of two-dimensional areas.

2. The microscope according to claim 1, wherein the control unit is further configured to operate as:
   an imaging condition storing section that stores the positions of the stage in association with imaging conditions for the specimen in the optical axis direction of the objective lens; and
   an imaging condition determining section that uses the imaging conditions stored in the imaging condition storing section to determine imaging conditions in the optical axis direction of the objective lens at the surface positions of the specimen estimated by the surface-shape estimating section.

3. The microscope according to claim 1, wherein the surface-shape estimating section estimates the surface shape of the specimen by determining an equation of a plane passing through three points from among the positions of the stage and coordinates of the associated surface positions of the specimen for the three points.

4. The microscope according to claim 1, wherein the control unit is further configured to operate as a surface-position detecting section that detects the associated surface positions of the specimen to be stored in the surface-position storing section.

5. The microscope according to claim 4, wherein the surface-position detecting section detects the associated surface positions of the specimen based on luminance information about the light from the specimen, detected by the light detecting section.

* * * * *